United States Patent
Bayere et al.

(10) Patent No.: US 8,066,471 B2
(45) Date of Patent: Nov. 29, 2011

(54) ANNULAR FLOW DUCT FOR A TURBOMACHINE THROUGH WHICH A MAIN FLOW CAN FLOW IN THE AXIAL DIRECTION

(75) Inventors: Romain Bayere, Berlin (DE); Malte Blomeyer, Mülheim an der Ruhr (DE); Christian Cornelius, Sprockhövel (DE); Torsten Matthias, Mülheim an der Ruhr (DE); Uwe Sieber, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 540 days.

(21) Appl. No.: 12/227,928

(22) PCT Filed: May 29, 2007

(86) PCT No.: PCT/EP2007/055183
§ 371 (c)(1),
(2), (4) Date: Dec. 2, 2008

(87) PCT Pub. No.: WO2007/141160
PCT Pub. Date: Dec. 13, 2007

(65) Prior Publication Data
US 2009/0290974 A1 Nov. 26, 2009

(30) Foreign Application Priority Data
Jun. 2, 2006 (EP) .................................... 06011528

(51) Int. Cl.
*F04D 27/02* (2006.01)
(52) U.S. Cl. ................. 415/58.5; 415/173.4; 415/173.7; 416/192

(58) Field of Classification Search ............... 415/173.3, 415/173.4, 173.5, 173.6, 173.7, 58.5; 416/192
See application file for complete search history.

(56) References Cited

U.S. PATENT DOCUMENTS

| 5,474,417 A | 12/1995 | Byrne |
| 5,762,470 A | 6/1998 | Gelmedov et al. |
| 6,102,655 A * | 8/2000 | Kreitmeier ................. 415/173.3 |

FOREIGN PATENT DOCUMENTS

| EP | 0719907 A1 | 7/1996 |
| EP | 1286022 A1 | 2/2003 |
| FR | 2325830 A1 | 4/1977 |
| GB | 2245312 A | 1/1992 |
| JP | 59051104 A | 3/1984 |
| JP | 05195815 A | 8/1993 |
| JP | 2002250205 A | 9/2002 |

* cited by examiner

*Primary Examiner* — Jarrett Stark
*Assistant Examiner* — Nicholas Tobergte

(57) ABSTRACT

Disclosed is an annular flow duct for a turbomachine, the flow duct arranged concentrically about a machine axis running in the axial direction and defined by a boundary wall of circular cross section for directing a main flow, wherein the boundary wall has a plurality of return flow passages distributed over its circumference and through which in each case a partial flow is detached from the main flow at a bleed position and returned to the main flow at a feed position situated upstream of the bleed position, and having aerofoils, arranged radically in the flow duct, of a blade ring, the aerofoil tips of which lie opposite the boundary wall, with a gap formed in each case, wherein the aerofoils are movable in a predetermined rotation direction along the circumference of the boundary wall. Furthermore, a compressor which is insensitive to pumping and flow separations, as viewed in rotation direction, the bleed position of each return flow passage lies upstream of the corresponding feed position.

20 Claims, 2 Drawing Sheets

ANNULAR FLOW DUCT FOR A TURBOMACHINE THROUGH WHICH A MAIN FLOW CAN FLOW IN THE AXIAL DIRECTION

CROSS REFERENCE TO RELATED APPLICATIONS

This application is the US National Stage of International Application No. PCT/EP2007/055183, filed May 29, 2007 and claims the benefit thereof. The International Application claims the benefits of European application No. 06011528.4 filed Jun. 2, 2006, both of the applications are incorporated by reference herein in their entirety.

FIELD OF INVENTION

The invention relates to a flow duct for a compressor, which flow duct is arranged concentrically about a machine axis running in the axial direction and, for axially guiding a main flow, is bounded by a boundary wall of circular cross section, the boundary wall having a plurality of return flow passages which are distributed over its circumference and through which in each case a partial flow which can be detached from the main flow at a bleed position can be returned to the main flow at a feed position situated upstream of the bleed position, and having aerofoils, arranged radially in the flow duct, of a blade collar, the aerofoil tips of which lie opposite the boundary wall, with a gap being formed in each case.

BACKGROUND OF THE INVENTION

Gas turbines and the modes of operation thereof are generally known. The air drawn in by a compressor of the gas turbine is compressed therein and afterwards mixed with fuel in a burner. Subsequently, the mixture flowing into a burning chamber burns to form a hot gas which subsequently flows through a turbine arranged downstream of the burning chamber and in the meantime, owing to the relaxation thereof, causes the rotor of the gas turbine to rotate. The rotation of the rotor drives, in addition to the compressor, also a generator which is linked to the rotor and converts the mechanical energy provided into electrical energy.

Both the compressor and the turbine are each composed of a plurality of successive stages each comprising two successive collars of blades. A turbine stage is composed of a guide blade collar formed by rotationally fixed guide blades and a moving blade collar arranged downstream thereof, whereas a compressor stage is composed of a moving blade collar and a guide blade collar arranged downstream thereof; viewed in each case in the flow direction of the medium flowing through. In the case of a single-shaft gas turbine, all moving blades are fixedly mounted on the common rotor.

The compressor stages, which are arranged in series, i.e. in axial succession, convey, owing to the moving blades revolving with the rotor, the drawn-in air from the input of the compressor in the direction of the compressor output, the air experiencing an incremental rise in pressure within each stage (or collar). The total rise in pressure over the compressor is the sum of all incremental pressure rises over each stage (or of all collars).

In a known manner, it can occur during operation of the gas turbine, in particular during operation of the compressor of the gas turbine, that, on approaching the stability limit, recirculation is increased as a result of defective flow and growing gap vortex. Within the compressor, this can cause a stall on one or more aerofoils, i.e. the flow of air in the main flow direction stops through a part of a compressor stage, as the energy transmitted from the rotor to the air is not sufficient to convey said air through the compressor stage and to establish the required pressure ratio of the compressor stage in question. The pressure ratio is the increase in pressure occurring over the relevant stage of the compressor, based on the input pressure of the respective stage. If the stall is not immediately counteracted, it can advance to form a rotating stall and possibly even lead to the entire flow of air through the compressor changing its direction; this is known as compressor pumping. This particularly critical operating state jeopardizes the blades and prevents a sufficient supply of compressor air to the burning chamber, so that a disturbed operation of the gas turbine must be diagnosed and the machine switched off immediately.

For this purpose, EP 0 719 907 A1, which seeks to counteract the described problem, discloses a structured boundary wall which lies opposite the tips of the moving blades. This structuring of the casing, known as the casing treatment, serves positively to influence the flow close to the gap for situations in which there is a risk of a stall on an aerofoil. Owing to the structuring, partial flows are bled from the main flow in the region of low flow velocities and subsequently returned to the main flow upstream of the bleed position. The air bled on the pressure side of the compressor blades in the tip region is supplied to the suction-side main flow of the compressor blade in question to prevent a stall which might occur there. The ducts guiding the partial flows are accordingly inclined relative to the machine axis or axis of rotation in such a way that—viewed in the direction of rotation of the rotor—the bleed position lies after the feed position at which the detached partial flow is returned to the main flow close to the gap. This is required so that, owing to the stagger angle and the tips, positioned obliquely relative to the direction of rotation, of the aerofoils, the partial flow can be guided beyond the aerofoil tip from the pressure side to the suction side. Thus, the longitudinal extension of the return flow duct is oriented substantially transversely to the straight line of the blade tip-side stagger angle, i.e. approximately parallel to the machine axis.

A similar device is known from EP 1 286 022 A1.

The aforementioned configurations have the drawback that the flow guidance of the partial flows is not optimal.

Furthermore, FR 2 325 830 discloses a compressor casing with grooves formed therein. These grooves are intended to prevent a stall of the limit flow and thus the pumping of the compressor, although the flow set by the grooves does not flow counter to the main flow, but rather with it.

SUMMARY OF INVENTION

The object of the invention is to provide a flow duct, of annular cross section, of a compressor, the casing treatment of which achieves a further improvement in the operating range of the compressor and a reduction in the tendency of the compressor toward stalls.

The invention provides a generic flow duct, suitable for influencing the flow close to the gap, for a turbomachine through which a flow flows preferably axially, wherein—viewed in the direction of rotation of the aerofoils—the bleed position of each return flow region lies before the corresponding feed position. The same applies to an inner boundary wall as part of the rotor, which wall moves relative to the freestanding ends of the aerofoils of guide blades.

The invention proposes that the longitudinal extension of the return flow regions and the stagger angle of the tip of the aerofoils do not, relative to the machine axis, intersect at a comparatively large angle and thus run transversely to each other, but rather that the longitudinal extension of the return flow passages and the stagger angle of the aerofoil in the tip region are inclined almost identically relative to the machine axis, so that they can run approximately parallel. The invention starts from the finding that the inflow direction of the partial flows in the relative system of the direction of rotation of the aerofoils is not optimally coordinated with one another. It is no longer assumed that the partial flow, bled through the return flow region for influencing the suction-side flow of an aerofoil, does not have to be bled from its pressure side and guided via the tip of the aerofoil in question. Owing to the—viewed in the circumferential direction—endless boundary wall and the aerofoils arranged in a likewise endless blade collar, it is possible to guide the partial flow from one of the aerofoils to the aerofoil advancing in the direction of rotation. Applied for all aerofoils of the blade collar, the pressure side and the suction side of two directly adjacent aerofoils can thus be joined together, via each return flow region, inclined in a suitable fashion relative to the machine axis, in the manner of an endless sequence, for influencing the suction-side aerofoil flow in order more effectively to avoid any risk of stalls at this location.

Owing to the inclination of each return flow region relative to the machine axis, the inflow velocity and inflow direction of each partial flow returned to the main flow are significantly improved over the prior art in the region of the respective feed position. This applies in particular to aerofoils which are flowed against transonically or portions of aerofoils lying on a comparatively large radius in relation to the machine axis. The kinematics of the main flow stabilized in accordance with the invention, in particular of the main flow close to the gap, can thus also be significantly improved. In addition, the selected inflow direction of the partial flow, based on the machine axis, allows the swirl in the main flow to be intensified, and this has an advantageous effect on the local flowing and the efficiency of the compressor.

The same advantages can be achieved in the case of freestanding guide blades which, radially outwardly fastened, lie with their free aerofoil tips opposite a rotating boundary wall arranged on the rotor, with a gap being formed. In this case, the casing treatment according to the invention is provided in the rotor and is moved in conjunction with said rotor in relation to the stationary guide blades.

As a result of these measures according to the invention, the start of the stall is displaced to lower mass flow rates, and this widens the range of operation of a compressor equipped therewith. Likewise, a stall which might jeopardize operation, or "pumping", occurs less frequently during operation of a compressor of this type.

Advantageous configurations are described in the subclaims.

According to a first advantageous development of the invention, the number of the return flow passages is equal to the number or equal to the integral multiple of the aerofoils. This allows a particularly uniformly distributed casing treatment to be defined along the circumference, thus allowing uniform influencing of the flow, close to the gap, of aerofoils advancing in operation to be achieved at each point of the circumference.

Preferably, the bleed position of one return flow region lies opposite the tip of one of the aerofoils and the associated feed position of one return flow region lies in that region of the circumference of the boundary wall in which lies the tip of the aerofoil advancing relative to one aerofoil in the direction of rotation. Accordingly, the partial flow bled from an aerofoil is provided for influencing the adjacent aerofoil in the direction of advancement. Owing to this measure, return flow regions which are inclined comparatively markedly relative to the machine axis, but also in the same direction as the stagger angle, are provided so that the partial flow issuing therefrom can help advantageously to influence the swirl occurring in the main flow.

The aforementioned measure is particularly efficient if the bleed position and the feed position of each return flow region are distributed over the circumference in such a way that during a movement of the aerofoils along the boundary wall at a point in time a pressure side wall of one aerofoil is arranged—viewed in the direction of rotation—immediately before the bleed position of one return flow region and a suction side wall of the aerofoil advancing relative to one aerofoil is arranged immediately after the feed position of one return flow region.

Conventionally, the bleed position of each return flow region is arranged in the portion of the boundary wall that is provided upstream of the outflow edges of the aerofoils lying opposite the boundary wall. This discloses a particularly effective casing treatment.

In a further configuration of the invention, the axial feed position of each return flow region is arranged in the portion of the boundary wall that is provided upstream of the front edges of the aerofoils which lie opposite the boundary wall. This has a particularly advantageous effect on the swirl.

Expediently, the return flow region can be embodied at least partly as a return flow duct running within the boundary wall of the flow duct. In this case, the return flow passages can be separated by plates and thus form return flow ducts distributed over the circumference; however, they can also be embodied as grooves formed in the surface of the boundary wall. Preferably, the plates distributed over the circumference can be embodied in such a way that an optimum inflow of the front edges of the aerofoil is achieved. For this purpose, the plates can be embodied along their longitudinal extension for example as profiled guide elements or guide blades, as a result of which a further improved mode of operation of the casing treatment is to be expected. In particular, if appropriate, higher outgoing or inflow velocities of the partial flows can be achieved in this way, even independently of whether or not the casing treatment is embodied in accordance with the invention.

For reasons of strength and assembly reasons, the plates carry an axial portion of the boundary wall lying between the bleed position and the feed position.

The configuration of the invention has been found to be particularly advantageous in which the return flow regions distributed over the circumference start and end on the bleed side and/or on the feed side in each case in an annular gap encircling endlessly along the circumference. Should non-uniform inflows, distributed over the circumference, into the return flow region or outflows from the return flow region occur, a standardization of for example local pressures and flow conditions can be achieved in this way. In this case, the positions to be extracted for determining the inclination of the return flow passages are in each case then to be seen in the portion of the circumference in which the plates, inclined relative to the machine axis, start and end.

BRIEF DESCRIPTION OF THE DRAWINGS

The preceding and other features and advantages of the present invention will become clearer from the following description of an embodiment. In the drawings.

DETAILED DESCRIPTION OF INVENTION

Figure 1:
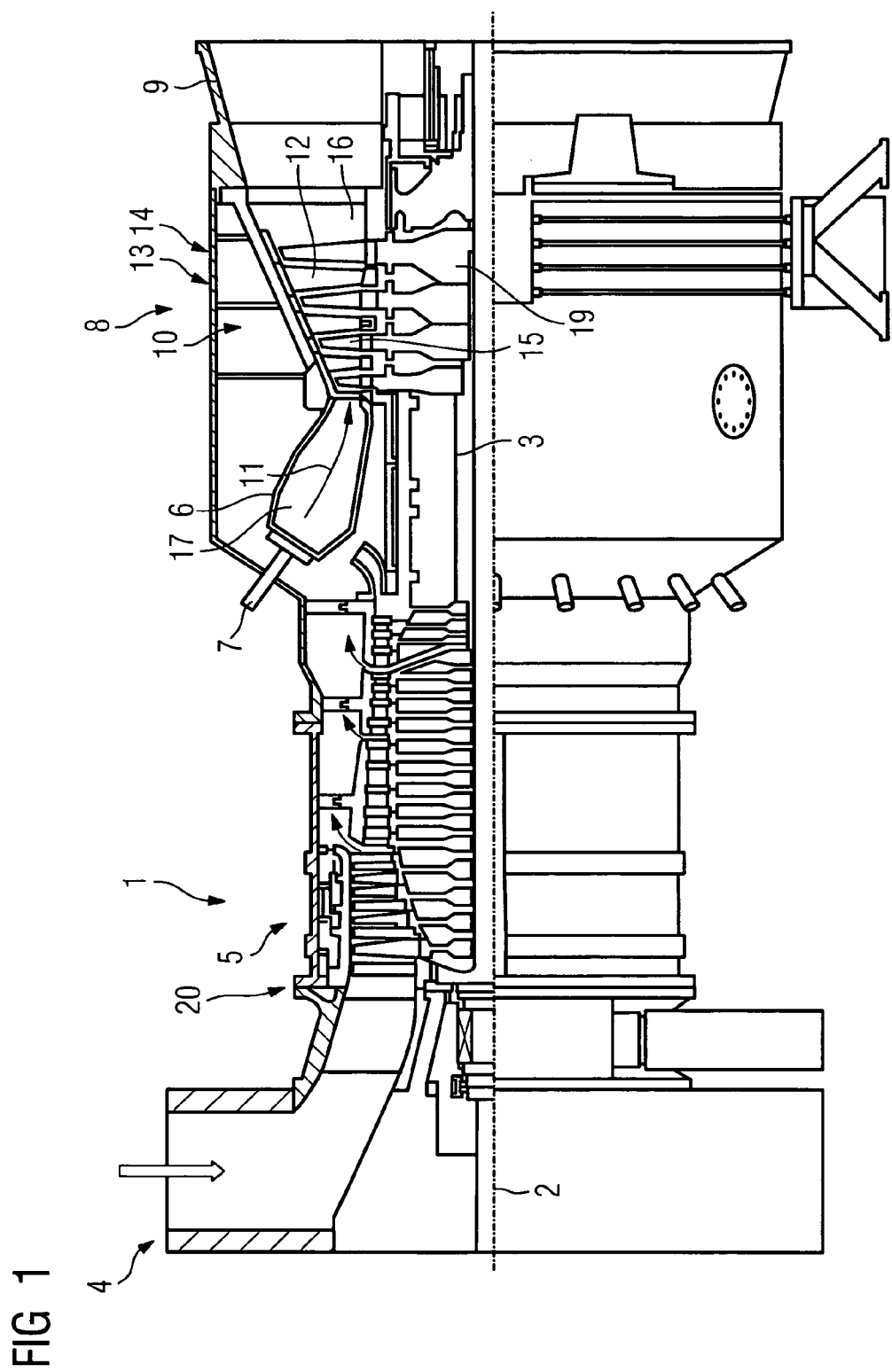
FIG. 1 is a longitudinal partial section of a gas turbine.

FIG. 1 is a longitudinal partial section of a gas turbine 1. Said gas turbine has in the interior a rotor 3 which is mounted so as to be able to rotate about a machine axis 2 and is also referred to as a turbine rotor. Along the rotor 3 there follow in succession a suction casing 4, a compressor 5, a toroidal annular burning chamber 6 comprising a plurality of burners 7 arranged rotationally symmetrically to one another, a turbine unit 8 and a waste gas casing 9. The annular burning chamber 6 forms a combustion chamber 17 which is connected to an annular hot gas duct 16. There, four turbine stages 10, arranged one after another, form the turbine unit 8. Each turbine stage 10 is formed from two blade rings. Viewed in the direction of flow of a hot gas 11 generated in the annular burning chamber 6, a respective series 13 of guide blades is followed in the hot gas duct 16 by a series 14 formed from moving blades 15. The guide blades 12 are fastened to the stator, whereas the moving blades 15 of a series 14 are each attached to the rotor 3 by means of a disk 19. A generator or a machine tool (not shown) is linked to the rotor 3.

Figure 2:
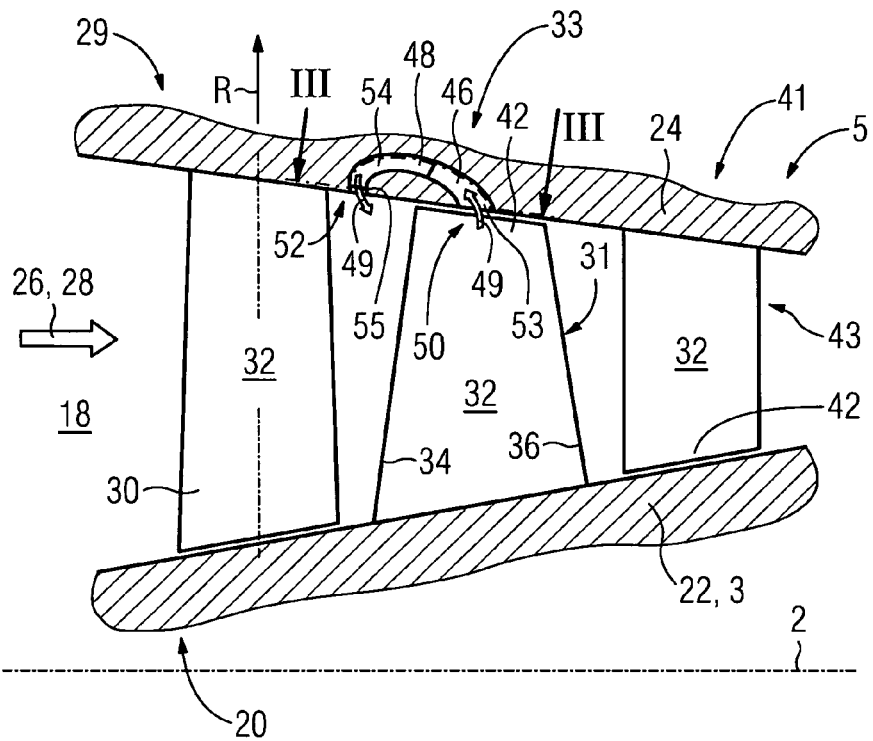
FIG. 2 is a schematic view through the inlet-side cross section of the compressor with a casing treatment arranged in the outer casing wall.
Figure 3:
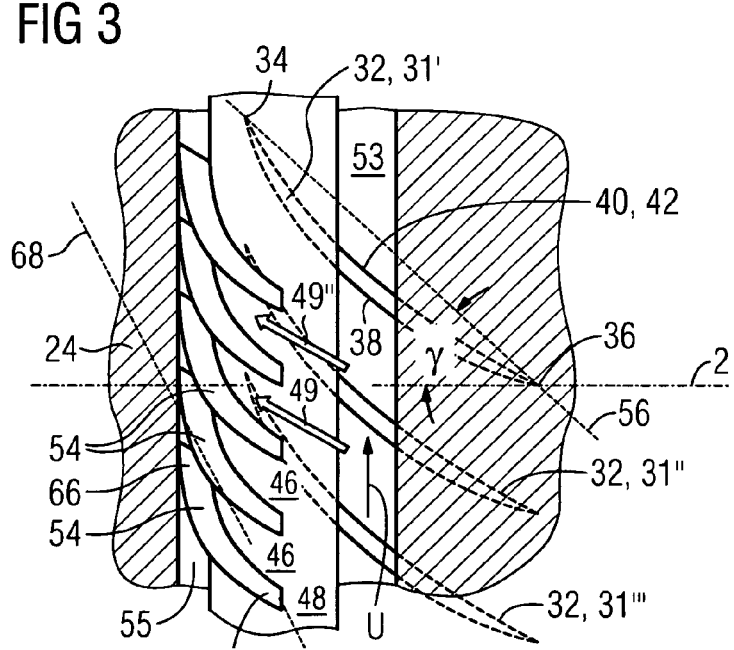
FIG. 3 is a plan view onto the casing treatment according to FIG. 2 from radially outside in the direction toward the machine axis.

FIG. 2 is a schematic cross section through the inlet-side end 20 of the compressor 5, in which a conically tapering flow duct 18 is provided. The flow duct 18 is surrounded radially inwardly by a rotor-side boundary wall 22 and radially outwardly by a casing-side boundary wall 24 which are each arranged concentrically with the machine axis 2. Viewed in the main flow direction 28 of the main flow 26, there is provided first a collar 29 of pre-guide blades 30 which can rotate about the radial direction R and by means of which the mass flow of the main flow 26 can be adjusted as required. An aerofoil 32, fastened to the rotor 3, of a moving blade 31 of the moving blade collar 33 of a first compressor stage is shown downstream of the pre-guide blades 30. Each aerofoil 32 comprises a front edge 34, against which the main flow 26 flows first, and a rear edge 36 at which the main flow 26 leaves the aerofoil 32. The aerofoils 32 are each formed by a suction-side blade wall 38 which is arched in a substantially convex manner and by a pressure-side blade wall 40 which is arched in a substantially concave manner (FIG. 3). The aerofoil 32 of the moving blade 31 is braced on one side to the rotor 3, so that its aerofoil tip 42 lies opposite the outer boundary wall 24, with a gap being formed.

Downstream of the moving blade 31, the collar 41, associated with the first compressor stage, of guide blades 43 is fastened to the outer boundary wall 24. Each guide blade 43 is free-standing, i.e. the tip 42, lying opposite the inner boundary wall 22, of the aerofoil 32 is not secured in a fastening ring encompassing the rotor 3, but rather lies opposite the boundary wall 22 arranged on the rotor 3, with a gap also being formed. The aerofoil 32 of the guide blade 43 is accordingly braced to the housing on one side merely radially on the outside.

A casing treatment, which comprises a plurality of return flow passages 46, distributed uniformly over the circumference of the outer boundary wall 24, in the form of return flow ducts 48 arranged within the outer boundary wall 24, is provided in an axial portion of the outer boundary wall 24 that partly lies opposite the aerofoil tip 42 of the moving blade 31. Alternatively, the return flow passages 46 could also be embodied as grooves milled into the outer boundary wall 24.

The return flow ducts 48 distributed over the circumference are separated from one another by plates 54. The plates 54 extend merely partially over the entire length of the return flow passages 46. This allows the provision, both on the inflow side and on the bleed side, of a respective annular gap 53, 55 encircling endlessly in the boundary wall 24 for bleeding the partial flow 69 and for returning it to the main flow 26.

Through the return flow passages 46, a partial flow 49 can be detached from the main flow 26 at a bleed position 50 and be returned downstream—based on the bleed position 50 and the main flow direction 28—to the main flow 26 in a feed position 52.

FIG. 3 is in this regard a plan view taken along the sectional line III-III. The same elements of FIG. 2 are denoted by identical reference numerals. The plan view shows three schematically illustrated moving blades 31', 31'', 31''' with the associated aerofoils 32 thereof. The aerofoils 32 each have the suction-side blade wall 38 and the pressure-side blade wall 40 which each extend from the inflow-side front edge 34 to the outflow-side rear edge 36. A straight line 56 connecting the front edge 34 to the rear edge 36 intersects the machine axis 2 at a stagger angle γ.

Through the first annular gap 53, the partial flows 49 can flow into the return flow region 46—i.e. out of the drawing plane. The partial flows 49, which then flow through the boundary wall 24 counter to the main flow direction 28, are subsequently returned, after flowing through the return flow ducts 48, to the main flow 26 through the second annular gap 55 arranged upstream of the front edge 34.

The plates 54 can be formed in the form of aerodynamically optimized profiles, as a result of which a particularly efficient mode of operation of the casing treatment is to be expected. The plates 54 each have two mutually opposing ends 64, 66. A straight line 68 connecting the ends 64, 66 of one of the plates 54 is inclined relative to the machine axis 2 in a similar manner to the straight line 56 which describes the stagger angle γ. Both straight lines 56, 68 enclose a minimum angle which is less than 30°.

As the embodiment shown provides bleed-side and feed-side annular gaps 53, 55, the positions to be extracted for determining the inclination of the return flow ducts 48 are each to be seen in the portion of the circumference in which the plates 54, which are inclined relative to the machine axis 2, start and end.

Owing to the comparatively large inclination of the plates 54 relative to the machine axis 2—marked by the straight line 68, which runs in a similar manner to the stagger angle γ, —each partial flow 49 flowing through the return flow ducts 48 is deflected in such a way that there is impressed thereon a flow component which is aligned with the direction of rotation U of the moving blades 31. Thus, each partial flow 49 bled from the main flow 26 is returned—viewed in the direction of rotation U of the moving blades 31—to the main flow 26 at a position advancing based on the bleed position 50.

For example, the partial flow provided with the reference numeral 49'' is bled from the pressure-side blade wall 40 of the moving blade 31'' and fed into the region before the front edge 34 of the moving blade 31' which is arranged in the direction of advancement based on the moving blade 31''.

Figure 4:
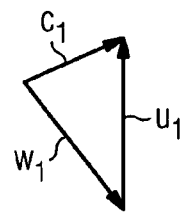
FIG. 4 shows the velocity triangle for the arrangement shown in FIG. 3.

FIG. 4 shows the velocity triangle which is associated with FIG. 3 and in which $u_1$ denotes the velocity vector of the aerofoils 32 in the tip region, $c_1$ denotes the velocity vector of the partial flow 49 which is supplied to the main flow 26 through a return flow duct 48, and $w_1$ denotes the velocity vector, the main flow 26 flowing against the aerofoil 32 in the region of the aerofoil tip 42. The velocity triangle reveals that each partial flow 49 has a flow component aligned with the direction of rotation U and not, as in the closest prior art, a flow component directed in the opposite direction. This allows the swirl of the main flow 26 to be positively intensified, as a result of which, during operation of the compressor 5 proceeding close to the pump limit, a stall of the suction-side flow occurs in a manner further delayed compared to the closest prior art. This is achieved in that parts of the main flow 26 are returned from the region of low flow velocities above the aerofoil tip 42 to the front edge 34 of the moving blade 31, where they are blown in preferably at the greatest possible velocity; this reduces the blockage responsible for the pumping. In addition, the partial flow 49 returned to the main flow 26 has a positive axial flow component. Accordingly, an at least partial reversal of the direction of flow of the partial flow 49 into the direction of flow of the main flow 26 takes place in the region of the feed position 52. The proposed solution allows the flow guidance of the partial flow 49 and main flow 26 to be further improved, in particular during partial load operation, as for the first time the inflow direction of the partial flow 49 in the relative system of the moving blade 31, as illustrated in FIG. 4, is taken into account and improved.

In addition, profiled blades 54, which along their longitudinal extension are arched in a similarly aerodynamic manner to the aerofoils 32 of compressor moving and guide blades 31, 43, allow particularly low-loss guidance of the partial flows 49 through the or along the outer boundary wall 24, independently of the invention.

Overall, the invention provides a compressor 5 through which flow flows axially and having a casing treatment which is less sensitive to stalls and "pumping", as the inflow angle of the partial flows 49, which are returned through the boundary wall 22, 24, is taken into account and improved in the relative system of the moving blade 31. For this purpose, the ducts 48 guiding the partial flow 49 are inclined relative to the direction of rotation U in such a way that each rotating moving blade 31 passes first the bleed openings 50 and afterwards the feed openings 52.

The invention claimed is:

1. An annular flow duct of a turbomachine a, comprising:
a boundary wall of circular cross section arranged concentrically about a machine axis running in an axial direction of the turbomachine, where the boundary wall operatively guides a main flow, the boundary wall having
a plurality of return flow passages distributed over the boundary wall circumference and through which in each case a partial flow is detached from the main flow at a bleed position and is returned to the main flow at a feed position situated upstream of the bleed position, and
a plurality of aerofoils arranged radially in the flow duct of a blade collar where a tip of each aerofoil is arranged radially opposite the boundary wall and forming a gap in each case, wherein aerofoils of moving blades are movable in a predetermined direction of rotation along the circumference of the boundary wall or the boundary wall is movable in a predetermined direction of rotation relative to the aerofoils of stationary guide blades of the blade collar,
wherein the bleed position of each return flow passage lies before of a corresponding feed position as viewed in the direction of rotation.

2. The annular flow duct as claimed in claim 1, wherein the number of the return flow passages is equal to the number or equal to an integral multiple of the aerofoils.

3. The flow duct as claimed in claim 2, wherein the bleed position of one return flow passage lies opposite the tip of one of the aerofoils and the associated feed position of one return flow passage is arranged in a region of the circumference of the boundary wall in which lies the tip of the aerofoil advancing relative to one aerofoil in the direction of rotation.

4. The flow duct as claimed in claim 3, wherein the bleed position and the feed position of the return flow passages are distributed over the circumference such that, during a movement of the aerofoils along the boundary wall at a point in time, a pressure side wall of one aerofoil is arranged immediately before the bleed position, viewed in the direction of rotation, of one return flow passage and a suction side wall of the aerofoil advancing relative to one aerofoil in the direction of rotation is arranged immediately after the feed position of the corresponding return flow passage.

5. The flow duct as claimed in claim 4, wherein, viewed axially, the bleed position of each return flow passage is arranged in the portion of the boundary wall provided upstream of a rear edges of the aerofoils lying opposite the boundary wall.

6. The flow duct as claimed in claim 5, wherein, viewed axially, the feed position of each return flow passage is arranged in the portion of the boundary wall provided upstream of the front edges of the aerofoils lying opposite the boundary wall.

7. The flow duct as claimed in claim 6, wherein the return flow passages open in the region of the feed position into the flow duct such that the partial flow which flows back therethrough has an axial flow component aligned with the main flow.

8. The flow duct as claimed in claim 7, wherein each return flow passage is at least partly a return flow duct.

9. The flow duct as claimed in claim 8, wherein the return flow passages are separated by plates.

10. The flow duct as claimed in claim 9, wherein the plates are aerodynamically profiled along their longitudinal extension.

11. The flow duct as claimed in claim 10, wherein the bleeding of the return flows and/or feeding of the return flows into the main flow takes place in each case in an annular gap.

12. A compressor, comprising
a compressor rotor portion arranged along a longitudinal axis of the compressor; and
a flow duct having:
a boundary wall of circular cross section arranged concentrically about the compressor longitudinal, where the boundary wall operatively guides a main flow, the boundary wall having
a plurality of return flow passages distributed over the boundary wall circumference and through which in each case a partial flow is detached from the main flow at a bleed position and is returned to the main flow at a feed position situated upstream of the bleed position, and
a plurality of aerofoils arranged radially in the flow duct of a blade collar where a tip of each aerofoil is arranged radially opposite the boundary wall and forming a gap in each case, wherein aerofoils of moving blades are movable in a predetermined direction of rotation along the circumference of the boundary wall or the boundary wall is movable in a predetermined direction of rotation relative to the aerofoils of stationary guide blades of the blade collar,
wherein the bleed position of each return flow passage lies before of a corresponding feed position as viewed in the direction of rotation.

13. The compressor as claimed in claim 12, wherein the number of the return flow passages is equal to the number or equal to an integral multiple of the aerofoils.

14. The compressor claimed in claim 13, wherein the bleed position of one return flow passage lies opposite the tip of one of the aerofoils and the associated feed position of one return flow passage is arranged in a region of the circumference of the boundary wall in which lies the tip of the aerofoil advancing relative to one aerofoil in the direction of rotation.

15. The compressor as claimed in claim 14, wherein the bleed position and the feed position of the return flow passages are distributed over the circumference such that, during a movement of the aerofoils along the boundary wall at a point in time, a pressure side wall of one aerofoil is arranged immediately before the bleed position, viewed in the direction of rotation, of one return flow passage and a suction side wall of the aerofoil advancing relative to one aerofoil in the direction of rotation is arranged immediately after the feed position of the corresponding return flow passage.

16. The compressor as claimed in claim 15, wherein, viewed axially, the bleed position of each return flow passage is arranged in the portion of the boundary wall provided upstream of a rear edges of the aerofoils lying opposite the boundary wall.

17. The compressor as claimed in claim 16, wherein, viewed axially, the feed position of each return flow passage is arranged in the portion of the boundary wall provided upstream of the front edges of the aerofoils lying opposite the boundary wall.

18. The compressor as claimed in claim 17, wherein the return flow passages open in the region of the feed position into the flow duct such that the partial flow which flows back therethrough has an axial flow component aligned with the main flow.

19. The compressor as claimed in claim 18, wherein each return flow passage is at least partly a return flow duct.

20. The compressor as claimed in claim 19, wherein the return flow passages are separated by plates.

* * * * *